(12) United States Patent
Cariello et al.

(10) Patent No.: US 12,050,773 B2
(45) Date of Patent: Jul. 30, 2024

(54) COMPLETION FLAG FOR MEMORY OPERATIONS

(71) Applicant: Micron Technology, Inc., Boise, ID (US)

(72) Inventors: Giuseppe Cariello, Boise, ID (US); Jonathan S. Parry, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 151 days.

(21) Appl. No.: 17/400,942

(22) Filed: Aug. 12, 2021

(65) Prior Publication Data

US 2023/0046535 A1    Feb. 16, 2023

(51) Int. Cl.
*G06F 3/06* (2006.01)

(52) U.S. Cl.
CPC ............ *G06F 3/0604* (2013.01); *G06F 3/061* (2013.01); *G06F 3/0655* (2013.01); *G06F 3/0679* (2013.01)

(58) Field of Classification Search
CPC ............................. G06F 3/0604; G06F 3/0679
See application file for complete search history.

(56) References Cited

U.S. PATENT DOCUMENTS

| | | | | |
|---|---|---|---|---|
| 2011/0219171 A1* | 9/2011 | Kuehne | ................. | G06F 3/0659 711/E12.001 |
| 2011/0276775 A1* | 11/2011 | Schuetz | .............. | G06F 13/1673 711/E12.002 |
| 2019/0102097 A1* | 4/2019 | Madraswala | .......... | G11C 16/26 |
| 2021/0294503 A1* | 9/2021 | Lee | ........................... | G06F 1/28 |

* cited by examiner

*Primary Examiner* — David Yi
*Assistant Examiner* — Nicholas A. Paperno
(74) *Attorney, Agent, or Firm* — Holland & Hart LLP

(57) ABSTRACT

Methods, systems, and devices for using a completion flag for memory operations are described. A completion flag for a memory device may indicate whether at least one access operation has been completed at the memory device. A controller may poll the completion flag, and if the completion flag indicates that at least one access operation has been completed at the memory device, the controller may poll a status register for the memory device to obtain additional information regarding one or more completed access operations at the memory device.

24 Claims, 7 Drawing Sheets

COMPLETION FLAG FOR MEMORY OPERATIONS

FIELD OF TECHNOLOGY

The following relates generally to one or more systems for memory and more specifically to a completion flag for memory operations.

BACKGROUND

Memory devices are widely used to store information in various electronic devices such as computers, user devices, wireless communication devices, cameras, digital displays, and the like. Information is stored by programing memory cells within a memory device to various states. For example, binary memory cells may be programmed to one of two supported states, often corresponding to a logic 1 or a logic 0. In some examples, a single memory cell may support more than two possible states, any one of which may be stored by the memory cell. To access information stored by a memory device, a component may read, or sense, the state of one or more memory cells within the memory device. To store information, a component may write, or program, one or more memory cells within the memory device to corresponding states.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), 3-dimensional cross-point memory (3D cross point), not-or (NOR) and not-and (NAND) memory devices, and others. Memory devices may be volatile or non-volatile. Volatile memory cells (e.g., DRAM cells) may lose their programmed states over time unless they are periodically refreshed by an external power source. Non-volatile memory cells (e.g., NAND memory cells) may maintain their programmed states for extended periods of time even in the absence of an external power source.

DETAILED DESCRIPTION

Figure 1:
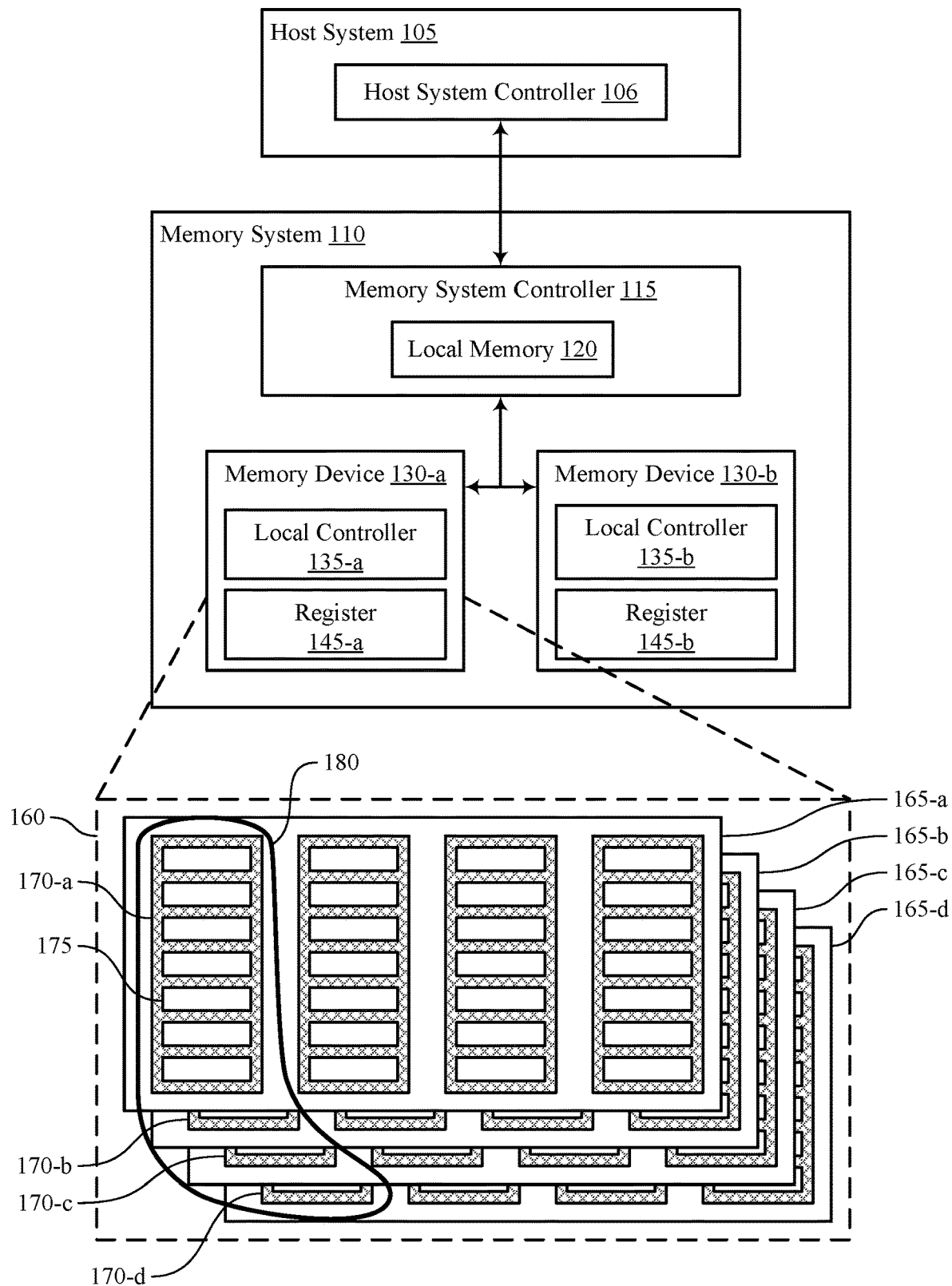
FIG. 1 illustrates an example of a system that supports a completion flag for memory operations in accordance with examples as disclosed herein.

A memory system may include a controller and multiple memory devices. For example, the memory system may include multiple not-and (NAND) devices, where each NAND device may include a memory die having a set of planes. The memory system may transmit access commands (e.g., read commands, program commands, erase commands) to the memory devices (i.e., one or more of the memory devices may each receive an access command). For example, the memory system may transmit an access command to a memory device (e.g., including a memory die) indicating for an access operation to be executed at one of the planes of the memory device. In some examples, the planes of the memory device may be independent and may execute operations in parallel (e.g., asynchronously).

In some examples, the controller may execute round robin polling of the status register of each active memory device (e.g., each memory device that has received but not yet been confirmed as having finished executing one or more access commands) to determine if a given memory device has completed one or more previously commanded access operations. For example, each memory device may include a status register configured to store a quantity of bits, where each bit is associated with one of the planes of the memory device and indicates whether an access operation has been completed at the associated plane. However, polling the status registers may involve an undesirable amount of signaling overhead (e.g., increased latency and power consumption), such as due to each status register including multiple bits to be communicated in response to each polling request. Further, polling multiple status registers (e.g., of multiple memory dies) concurrently may not be possible, such as if the memory dies are all coupled with the host controller via a common bus, which may not be wide enough to concurrently carry the contents of multiple status registers.

Systems, techniques, and devices are described herein for polling a completion flag associated with a memory device (e.g., a NAND device and associated memory die), and in some cases for polling (e.g., concurrently) multiple completion flags associated with multiple respective memory devices. Such a completion flag may reduce signaling overhead and increase possible parallelism of related signaling (e.g., if multiple memory devices are coupled with a controller via a common bus), among other benefits that may be appreciated by one of ordinary skill in the art. For example, a single completion flag as described herein may be a single bit.

A completion flag for a memory die may indicate whether an access operation has been completed at any plane of the corresponding memory die. For example, the memory system may issue access commands corresponding to one or more planes of a memory die. In response to one of the one or more planes of the memory die completing an access operation, the memory device may set a corresponding bit of the status register, such that the status register bits may each indicate whether an access operation has been completed at the corresponding plane (e.g., whether the corresponding plane is in a ready state). Additionally, the memory device may set the completion flag (e.g., the memory device may set the completion flag to '1') based on an access operation having been completed at any of the one or more planes of the memory die (e.g., based on any of the one or more planes being in the ready state). Thus, the completion flag may indicate whether at least one access operation has been completed at the memory die (e.g., whether any bit of the status register for the memory die is set).

The memory system may poll the completion flag of a memory die (e.g., concurrently with polling the completion flags of one or more other memory dies coupled with a shared bus), and in response to detecting that the completion flag is set (e.g., that the completion flag indicates that the associated memory die has completed at least one access operation), the memory system may then read the status register associated with the memory die. In response to polling the memory system polling the flag, the memory device may reset the flag (e.g., set the completion flag to '0'). Additionally or alternatively, in response to the memory system reading the status register, the memory device may reset the flag and the status register. As used herein, setting a flag or bit may refer to configuring the flag or bit to have a first logic value, and resetting the flag or bit may refer to configuring the flag to having a second logic value different than (e.g., opposite to) the first logic value. For example, a set flag or bit may have a logic value of '1' while a reset flag or bit may have a logic value of '0', or a set flag or bit may have a logic value of '0' while a reset flag or bit may have a logic value of '1'.

The use of completion flags as described herein may reduce signaling overhead (e.g., reduce latency and power consumption) as compared to polling the status registers. Additionally, the use of completion flags as described herein may support increased parallelism in signaling (e.g., a memory system may concurrently poll or receive completion flags for multiple memory dies, even if the multiple dies share a common bus). While certain examples may be described in the context of NAND memory devices, it is to be understood that aspects of the teachings herein may be applied in the context of any memory type.

Features of the disclosure are initially described in the context of systems, devices, and circuits with reference to FIG. 1. Features of the disclosure are described in the context of a timing diagram and a system with reference to FIGS. 2-3. These and other features of the disclosure are further illustrated by and described in the context of an apparatus diagram and flowchart that relate to a completion flag for memory operations with reference to FIGS. 4-7.

FIG. 1 illustrates an example of a system 100 that supports a completion flag for memory operations in accordance with examples as disclosed herein. The system 100 includes a host system 105 coupled with a memory system 110.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other possibilities.

The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any other computing device that includes memory and a processing device.

The system 100 may include a host system 105, which may be coupled with the memory system 110. In some examples, this coupling may include an interface with a host system controller 106, which may be an example of a controller or control component configured to cause the host system 105 to perform various operations in accordance with examples as described herein. The host system 105 may include one or more devices, and in some cases may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., peripheral component interconnect express (PCIe) controller, serial advanced technology attachment (SATA) controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may in some cases be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a PCIe interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open NAND Flash Interface (ONFI), and a Low Power Double Data Rate (LPDDR) interface. In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

The memory system 110 may include a memory system controller 115 and one or more memory devices 130. A memory device 130 may include one or more memory arrays of any type of memory cells (e.g., non-volatile memory cells, volatile memory cells, or any combination thereof). Although two memory devices 130-a and 130-b are shown in the example of FIG. 1, the memory system 110 may include any quantity of memory devices 130. Further, if the memory system 110 includes more than one memory device 130, different memory devices 130 within the memory system 110 may include the same or different types of memory cells.

The memory system controller 115 may be coupled with and communicate with the host system 105 (e.g., via the physical host interface) and may be an example of a controller or control component configured to cause the memory system 110 to perform various operations in accordance with examples as described herein. For example, the memory system controller 115 may also be coupled with and communicate with memory devices 130 to perform operations such as reading data, writing data, erasing data, or refreshing data at a memory device 130—among other such operations—which may generically be referred to as access operations. The memory system controller 115 may in some cases be coupled with a memory device 130 via a bus, and the memory system controller 115 and the memory device 130 may communicate via the bus using a protocol (e.g., an ONFI protocol). In some cases, the memory system controller 115 may in some cases be coupled with multiple memory devices 130 via the same bus, which may be referred to as a shared bus or a common bus.

In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. In some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130.

The memory system controller 115 may include hardware such as one or more integrated circuits or discrete components, a buffer memory, or a combination thereof. The hardware may include circuitry with dedicated (e.g., hard-coded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally or alternatively include static random access memory (SRAM) or other memory that may be used by the memory system controller 115 for internal storage or calculations, for example, related to the functions ascribed herein to the memory system controller 115. Additionally or alternatively, the local memory 120 may serve as a cache for the memory system controller 115. For example, data may be stored in the local memory 120 if read from or written to a memory device 130, and the data may be available within the local memory 120 for subsequent retrieval for or manipulation (e.g., updating) by the host system 105 (e.g., with reduced latency relative to a memory device 130) in accordance with a cache policy.

Although the example of the memory system 110 in FIG. 1 has been illustrated as including the memory system controller 115, in some cases, a memory system 110 may not include a memory system controller 115. For example, the memory system 110 may additionally or alternatively rely upon an external controller (e.g., implemented by the host system 105) or one or more local controllers 135, which may be internal to memory devices 130, respectively, to perform the functions ascribed herein to the memory system controller 115. In general, one or more functions ascribed herein to the memory system controller 115 may in some cases instead be performed by the host system 105, a local controller 135, or any combination thereof. In some cases, a memory device 130 that is managed at least in part by a memory system controller 115 may be referred to as a managed memory device. An example of a managed memory device is a managed NAND (MNAND) device.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric random access memory (RAM) (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), electrically erasable programmable ROM (EEPROM), or any combination thereof. Additionally or alternatively, a memory device 130 may include one or more arrays of volatile memory cells. For example, a memory device 130 may include RAM memory cells, such as dynamic RAM (DRAM) memory cells and synchronous DRAM (SDRAM) memory cells.

In some examples, a memory device 130 may include (e.g., on a same die or within a same package) a local controller 135, which may execute operations on one or more memory cells of the respective memory device 130. A local controller 135 may operate in conjunction with a memory system controller 115 or may perform one or more functions ascribed herein to the memory system controller 115. For example, as illustrated in FIG. 1, a memory device 130-a may include a local controller 135-a and a memory device 130-b may include a local controller 135-b.

In some cases, a memory device 130 may be or include a NAND device (e.g., NAND flash device). A memory device 130 may be or include a memory die 160. For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single level cells (SLCs). Additionally or alternatively, a NAND memory device 130 may include memory cells configured to each store multiple bits of information, which may be referred to as multi-level cells (MLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170, and in some cases, concurrent operations may take place within different planes 165. For example, concurrent operations may be performed on memory cells within different blocks 170 so long as the different blocks 170 are in different planes 165. In some cases, an individual block 170 may be referred to as a physical block, and a virtual block 180 may refer to a group of blocks 170 within which concurrent operations may occur. For example, concurrent operations may be performed on blocks 170-a, 170-b, 170-c, and 170-d that are within planes 165-a, 165-b, 165c, and 165-d, respectively, and blocks 170-a, 170-b, 170-c, and 170-d may be collectively referred to as a virtual block 180. In some cases, a virtual block may include blocks 170 from different memory devices 130 (e.g., including blocks in one or more planes of memory device 130-a and memory device 130-b). In some cases, the blocks 170 within a virtual block may have the same block address within their respective planes 165 (e.g., block 170-a may be "block 0" of plane 165-a, block 170-b may be "block 0" of plane 165-b, and so on). In some cases, performing concurrent operations in different planes 165 may be subject to one or more restrictions, such as concurrent operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at the page level of granularity) but may be erased at a second level of granularity (e.g., at the block level of granularity). That is, a page 175 may be the smallest unit of memory (e.g., set of memory cells) that may be independently programmed or read (e.g., programed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may in some cases not be updated until the entire block 170 that includes the page 175 has been erased.

In some cases, a memory system controller 115 or a local controller 135 may perform operations (e.g., as part of one or more media management algorithms) for a memory device 130, such as wear leveling, background refresh, garbage collection, scrub, block scans, health monitoring, or others, or any combination thereof. For example, within a memory device 130, a block 170 may have some pages 175 containing valid data and some pages 175 containing invalid data. To avoid waiting for all of the pages 175 in the block 170 to have invalid data in order to erase and reuse the block 170, an algorithm referred to as "garbage collection" may be invoked to allow the block 170 to be erased and released as a free block for subsequent write operations. Garbage collection may refer to a set of media management operations that include, for example, selecting a block 170 that contains valid and invalid data, selecting pages 175 in the block that contain valid data, copying the valid data from the selected pages 175 to new locations (e.g., free pages 175 in another block 170), marking the data in the previously selected pages 175 as invalid, and erasing the selected block 170. As a result, the quantity of blocks 170 that have been erased may be increased such that more blocks 170 are available to store subsequent data (e.g., data subsequently received from the host system 105).

The system 100 may include any quantity of non-transitory computer readable media that support the use of a completion flag for memory operations. For example, the host system 105, the memory system controller 115, or a memory device 130 may include or otherwise may access one or more non-transitory computer readable media storing instructions (e.g., firmware) for performing the functions ascribed herein to the host system 105, memory system controller 115, or memory device 130. For example, such instructions, if executed by the host system 105 (e.g., by the host system controller 106), by the memory system controller 115, or by a memory device 130 (e.g., by a local controller 135), may cause the host system 105, memory system controller 115, or memory device 130 to perform one or more associated functions as described herein.

In some cases, a memory system 110 may utilize a memory system controller 115 to provide a managed memory system that may include, for example, one or more memory arrays and related circuitry combined with a local (e.g., on-die or in-package) controller (e.g., local controller 135).

In some examples, memory system controller 115 may perform polling operations on the memory devices 130 to determine a status of the operations being performed by each memory device 130. In some cases, the memory system controller 115 may conduct the polling operation in a round robin system. For example, the memory system controller 115 may first request a status of a first operation being executed at the memory device 130-a and then request a status of a second operation being executed at the memory device 130-b. In some cases, the second operation may be executed before the first operation. In such examples, the memory device 130-b may idly wait for the memory system controller 115 to request the status of the second operation. The idle wait period may increase the power consumption and latency of the system.

As described herein, each of the memory devices 130 may indicate whether at least one of the planes 165 has completed an access operation via a flag (e.g., a completion flag). That is, each memory device 130 may indicate to the memory system controller 115 (e.g., using a data line over a data bus coupling the memory devices 130 and memory system controller 115) whether the memory device 130 has completed at least one previously commanded access operation. For example, in response to a plane 165 of a memory device 130 completing an access operation, the local controller 135 associated with the memory device 130 may set the flag associated with the memory device 130 (e.g., may set a bit of the data line associated with the memory device 130 from a busy state to a ready-to-be-serviced state). Additionally, the local controller 135 may set a status register 145 at the memory device 130. For example, the status register 145 may include bits associated with each of the planes 165 of the die 160. The local controller 135 may set each bit of the status register 145 that corresponds to a plane 165 associated with a completed access operation.

In some cases, the memory system controller 115 may perform a polling operation (e.g., a concurrent polling operation) on the memory devices 130. For example, the memory system controller 115 may poll the flags associated with each memory device 130 (e.g., based on a single polling request sent by the memory system controller and received by all the memory devices via a shared bus, or via multiple concurrent polling requests to the memory device 130). In cases that the memory system controller 115 determines that a memory device 130 has at least one completed access operation (e.g., based on the flag associated with that memory device 130 being set), the memory system controller 115 may read a status register 145 associated with that memory device 130. Then, using the status bits read from the status register 145, the memory system controller 115 may identify each of the one or more planes 165 of the memory device 130 that is associated with a respective completed access operation. In response to identifying the one or more planes 165 of the memory device 130 associated with the completed access operations, the memory system controller 115 may service the identified planes 165. In some cases, the memory system controller 115 concurrently polling each of the memory device 130 may reduce the idle time and decrease the latency and power consumption of the system 100 as compared to the memory system controller 115 polling each of the memory devices 130 sequentially. Though certain examples are described herein in the context of a memory system controller 115 interacting with memory devices 130 (e.g., to poll completion flags and status registers and to receive related information and exchanged related commands and data), it is to be understood that alternatively, in other examples, a host system controller 106 may interact with memory devices 130 to implement the functionalities ascribed herein to a memory system controller 115 (e.g., a memory system controller 115 may be absent in some examples).

Figure 2:
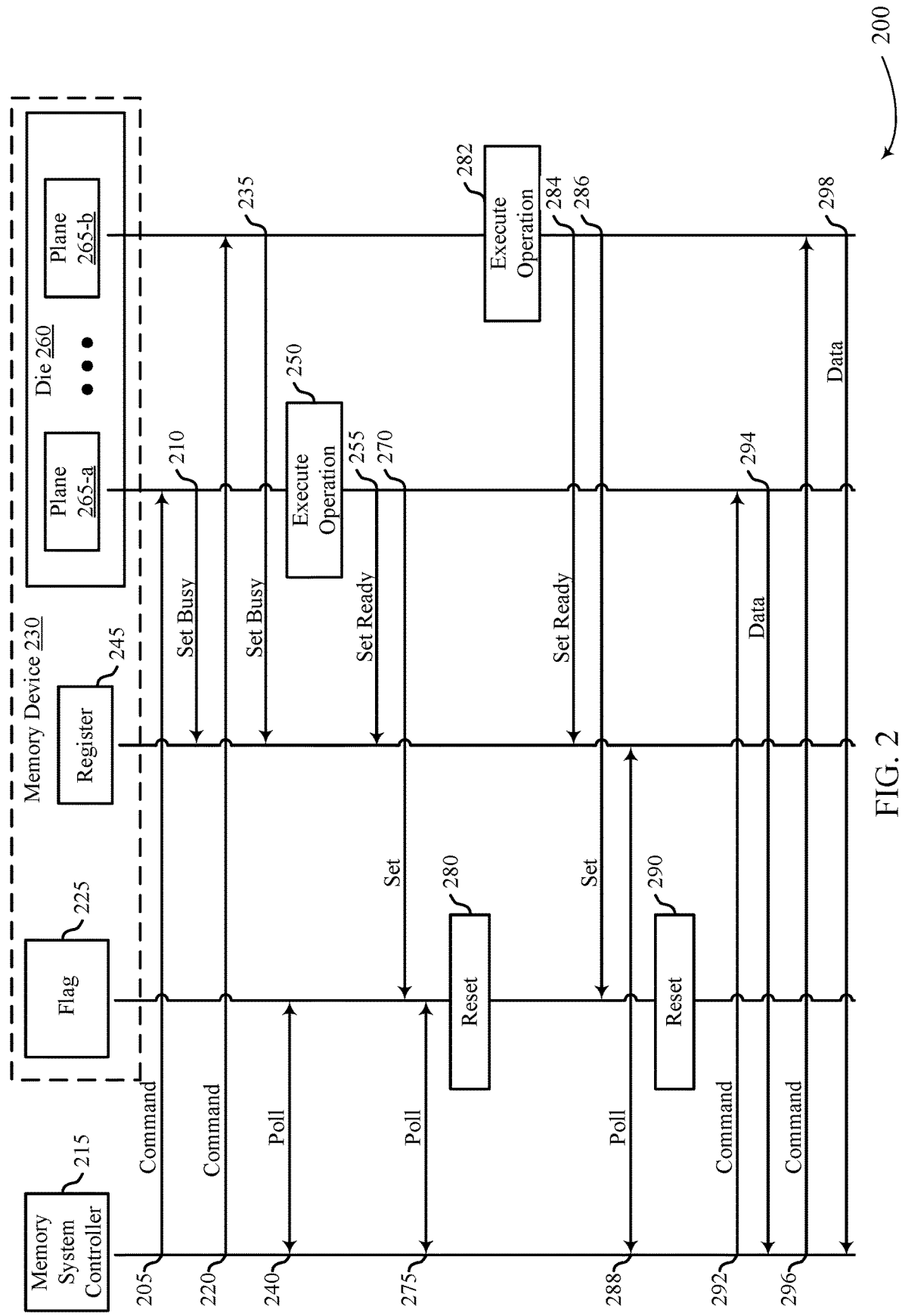
FIG. 2 illustrates an example of a timing diagram that supports a completion flag for memory operations in accordance with examples as disclosed herein.

FIG. 2 illustrates an example of a timing diagram 200 that supports a completion flag for memory operations in accordance with examples as disclosed herein. The timing diagram 200 may be performed by processing logic that may include hardware (e.g., processing system, circuitry, dedicated logic, programmable logic, microcode, hardware of a device, integrated circuit, etc.), software (e.g., instructions run or executed on a processing device), or a combination thereof. In some examples, the timing diagram 200 may be performed by a system as described with reference to FIG. 1. For example, the timing diagram may be performed by a memory system controller 215 (e.g., which may be an example of a memory system controller 115 or a host system controller 106 as described with reference to FIG. 1) and memory device 230 (e.g., which may be an example of a memory devices 130 as described with reference to FIG. 1). In some examples, the memory system controller 215 may execute a set of instructions to control the functional elements of the memory system to perform the functions described below. Although shown in a particular sequence or order, unless otherwise specified, the order of the processes may be modified. Thus, the illustrated examples are used as examples, and the illustrated processes may be performed in a different order, and some processes may be performed in parallel. FIG. 2 may illustrate the system 100 communicating signals and commands between a memory system controller 115 and a memory device 130 while conducting a concurrent polling operation.

The memory device 230 may include a memory die 260 that has a set of planes 265 including at least plane 265-a and plane 265-b. The memory device 230 may include a register 245 (e.g., an all plane status register) configured to store a set of status bits, where each of the status bits corresponds to one of the planes 265. The register 245 may indicate which of the planes 265 has completed an access operation and is thus ready to be serviced (e.g., ready to transmit or receive data associated with the access operation). For example, the status bit for a plane 265 (e.g., the first plane 265-a) may be set to a first value in response to the memory device 230 receiving a command for an access operation at the first plane 265-a to indicate that the first plane 265-a may be busy. Upon completion of the access operation, the status bit for the first plane 265-a may be set (e.g., reset) to a second value to indicate that the access operation has been completed, and thus the first plane 265-a may be ready for another operation. The memory device 230 may additionally include a controller for the memory device 230 (e.g., a local controller 135 as described with reference to FIG. 1), which may execute one or more of the operations illustrated within the timing diagram 200 as occurring at the memory device 230.

The memory system controller 215 may be coupled with the memory device 230, and in some cases may additionally be coupled with one or more other memory devices 230 (e.g., via a shared bus). The memory system controller 215 may transmit and receive communications (e.g., data, commands) to and from the memory device 230, for example via a bus.

The memory device 230 may maintain (e.g., store and manage the value of) a flag 225 (e.g., a completion flag), where the flag 225 may indicate whether any one of the planes 265 of memory device 230 is associated with a completed access operation. In some cases, the flag 225 may include a single bit associated with the memory device 230, which may be set to indicate a status of the memory device 230. For example, in response to the memory device 230 completing an access operation at any plane 265, the memory device 230 may set the flag 225 (e.g., to a first value such as a logical 1, a logical 0, an active high, or an active low) to indicate that at least one plane 265 is associated with a completed access operation). In some cases, the flag 225 may already be set (e.g., to the first value) upon completion of an access operation at a plane 265 (e.g., based on another plane 265 of the memory device 230 being associated with a completed access operation). In such cases, the memory device 230 may ensure that the flag 225 remains set (e.g., the memory device 230 may check whether the flag 225 is already set, and the memory device 230 may set the flag 225 if the flag 225 is not already set). In response to the memory system controller 215 polling the flag 225, the memory device 230 may reset the flag 225 (e.g., set the flag 225 to a second value different from the first value). Additionally, the memory device 230 may reset the flag 225 in response to the memory system controller 215 polling the register 245.

The memory system controller 215 may poll the flag 225 (e.g., periodically, opportunistically, or in response to a command) to identify whether the flag indicates completion of at least one access operation at the memory device 230. Based on the flag 225 indicating that at least one access operation has been completed, the memory system controller 215 may poll the register 245 to identify which of the planes 265 is associated with a completed access operation. Subsequently, the memory system controller 215 may transmit a command to any of the planes 265 associated with the completed access operations. In response to receiving the command from the memory system controller 215, the memory device 230 may transmit data corresponding to the access operation to the memory system controller 215 (e.g., via a direct memory access operation). Additionally or alternatively, in some cases, the command transmitted by the memory system controller 215 after identifying that a plane 265 has completed a previously command access operation may be a write command, as the plane 265 may be ready to execute a write command based on having completed the previously command access operation, and in response to receiving the command from the memory system controller 215, the memory device 230 may write data corresponding to the access operation to the plane 265.

The timing diagram 200 may illustrate an example of a scenario that includes the memory system controller 215 polling the flag 225 associated with the memory device 230 to identify any completed access operations at the memory device 230, which may serve to illustrate various aspects of the teachings herein. For example, at 205 a command to execute an access operation at the first plane 265-a may be received. For example, memory device 230 may receive, from the memory system controller 215, the command to execute the access operation associate with the first plane 265-a. The access operation may be an example of a snap read operation.

At 210, a first status bit of the register 245 corresponding to the first plane 265-a may be set to a first value indicated that the first plane 265-a is busy. For example, the memory device 230 may set the first status bit of the register 245 based on receiving the command at 205 associated with the plane 265-a.

At 220, a command to execute an access operation at the second plane 265-b may be received. For example, memory device 230 may receive, from the memory system controller 215, the command to execute the access operation associate with the first plane 265-a. The access operation may be an example of a snap read operation.

At 235, a second status bit of the register 245 corresponding to the second plane 265-b may be set to a first value indicating that the second plane 265-b is busy. For example, the memory device 230 may set the first status bit based on receiving the command at 220 associated with the plane 265-b.

At 240, the flag 225 may be polled (e.g., based on the memory system controller 215 transmitting the commands at 205 and 220). For example, the memory system controller 215 may transmit a polling request (e.g., a read status request) to the memory device 230 for an indication of the state of the flag (i.e., whether the flag has been set to the first value or to the second value). The memory device 230 may subsequently output an indication that the flag 225 is not set (e.g., is reset) to the memory system controller 215 based on receiving the polling request from the memory system controller 215. In some cases, the memory system controller 215 may poll more than one memory device 230 in parallel. For example, more than one memory device 230 may be coupled with a same bus, where the bus may thereby couple the memory system controller 215 with each of the memory devices 230. Here, the memory system controller 215 may execute polling of more than one memory device 230 concurrently (e.g., a single polling request issued by the memory system controller 215 may be received by the multiple memory devices 230 via the common bus). Further, different memory devices 230 may concurrently output respective indications of the state of their respective flags 225 (e.g., each memory device 230 may output a respective flag 225 via one or more respective lines—e.g., I/O pins or lines—of the bus, such that different memory devices 230 indicate their respective flags 225 via different lines of the bus during at least partially overlapping periods of time).

At 250, an operation may be executed at the plane 265-a. For example, the memory device 230 may execute an access operation indicated by the command received from the memory system controller 215 at 205.

At 255, a first status bit (e.g., corresponding to the plane 265-a) of the register 245 may be set by the memory device 230. For example, the memory device 230 may set the first bit to a first value to indicate that the access command at the first plane 265-a has been completed.

At 270, the flag 225 may be set (e.g., to a first value) to indicate that at least one of the planes 265 has completed an access operation. That is, the memory device 230 may set the flag based on the memory device executing the operation at the plane 265-a.

At 275, the flag 225 may be polled by the memory system controller 215. For example, the memory system controller 215 may transmit a polling request for the flag 225 to the memory device 230. In response, the memory device 230 may output, to the memory system controller 215, an indication that the flag 225 is set (e.g., indicating that at least one access operation has been completed at the memory device 230). If the flag 225 has been set to the first value (e.g., at 255), then an indication may be outputted to the memory system controller 215, for example by the memory device 230, where the indication indicates that the flag 225 has been set to the first value.

At 280, the flag 225 may be reset to a value indicating that no access operations have been completed at the memory device 230 (e.g., in response to the memory system controller 215 polling the flag 225 at 275).

At 282, an operation may be executed at the plane 265-b. For example, the memory device 230 may execute an access operation indicated by the command received from the memory system controller 215 at 220.

At 284, a second status bit (e.g., corresponding to the plane 265-b) of the register 245 may be set by the memory device 230. For example, the memory device 230 may set the second bit to a second value to indicate that the access command at the second plane 265-b has been completed.

At 286, the flag 225 may be set (e.g., to the first value) to indicate that at least one of the planes 265 has completed an access operation. That is, the memory device 230 may set the flag based on the memory device executing the operation at the plane 265-b. In the example of timing diagram 200, the flag 225 may be reset prior to setting the flag 225 at 286 (e.g., based on being reset at 280). In some other cases, the flag 225 may be set prior to 286 (e.g., in cases that the memory system controller 215 polls the flag 225 at 275 after 286). Here, the memory device 230 may ensure that the flag 225 is set at 286 (e.g., instead of setting the flag 225).

At 288, the register 245 may be polled by the memory system controller 215. That is, the memory system controller 215 may poll the register 245 in response to determining that the flag 225 is set at 275. For example, the memory system controller 215 may transmit the polling request to the memory device 230 to determine which of the planes 265 has completed an access operation. The memory device 230 may subsequently output a set of indications (e.g., the status bits of the register 245) that indicate which of the planes 265 have completed an access operation to the memory system controller 215.

At 290, the flag 225 may be reset (e.g., set to the second value). For example, the memory device 230 may reset the flag 225 in response to the memory system controller 215 polling the register 245. Additionally, the memory device 230 may optionally reset the register 245 at 290 (e.g., in response to the memory system controller 215 polling the register 245). For example, the memory device 230 may reset the flag 225 in response to having notified the memory system controller 215 of the completion of the operation at 282.

At 292, a command to output data associated with the first plane 265-a may be transmitted by the memory system controller 215 to the memory device 230. That is, the memory system controller 215 may issue the command to the memory device 230 to output data associated with the first plane 265-a based on the register 245 including a bit indicating that the plane 265-a is associated with a completed access operation. At 294, the data associated with the plane 265-a may be output by the memory device 230 to the memory system controller 215 (e.g., in response to the memory system controller 215 transmitting the command at 292). In some cases, the operations at 292 and 294 may correspond to a direct memory access operation.

At 296, a command to output data associated with the first plane 265-b may be transmitted by the memory system controller 215 to the memory device 230. That is, the memory system controller 215 may issue the command to the memory device 230 to output data associated with the first plane 265-b based on the register 245 including a bit indicating that the plane 265-b is associated with a completed access operation. At 298, the data associated with the plane 265-b may be output by the memory device 230 to the memory system controller 215 (e.g., in response to the memory system controller 215 transmitting the command at 296). In some cases, the operations at 296 and 298 may correspond to a direct memory access operation.

Figure 3:
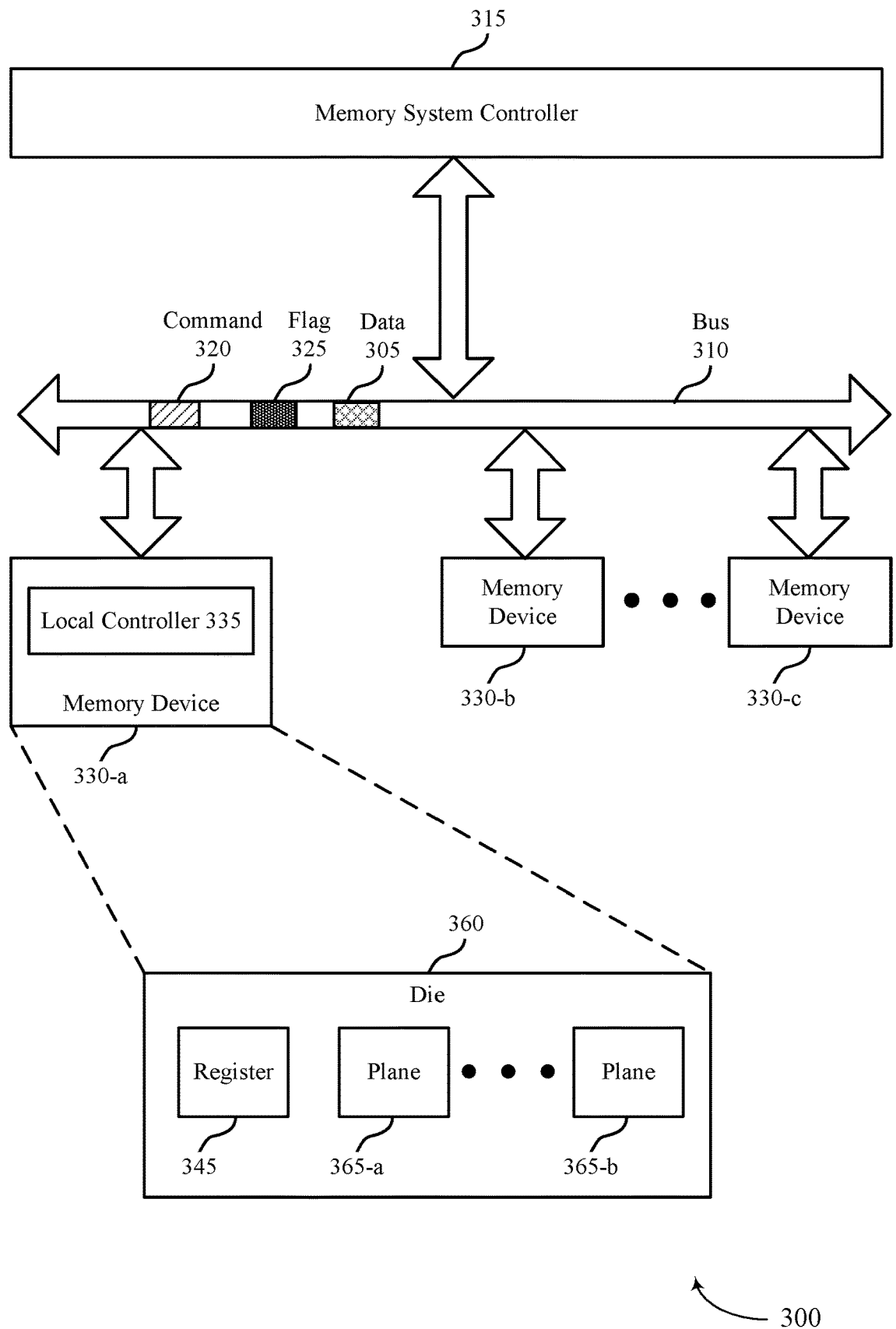
FIG. 3 illustrates an example of a system that supports a completion flag for memory operations in accordance with examples as disclosed herein.

FIG. 3 illustrates an example of a system 300 that supports a completion flag for memory operations in accordance with examples as disclosed herein. System 300 may be an example of a memory system 110 as described with reference to FIG. 1. System 300 may include a memory system controller 315, which may be an examples of a memory system controller 115 or host system controller 106 as described with reference to FIG. 1 or an example of a memory system controller 215 as described with reference to FIG. 2. System 300 may also include memory devices 330, which may each be an example of a memory devices 130 as described with reference to FIG. 1 or a memory device 230 as described with reference to FIG. 2. Each of the memory devices 330 may include a local controller 335 ((e.g., which may be an example of a local controller 135 as described with reference to FIG. 1), a register 345 (e.g., which may be an example of a register 245 as described with reference to FIG. 2), and a memory die 360 including a set of planes 365 (e.g., which may be examples of memory dies 260, planes 165, and planes 265 as described with reference to FIGS. 1 and 2).

The memory system controller 315 may be coupled with the memory devices 330 via a bus 310. The bus 310 may be an example of a shared bus. In some cases, memory system controller 315 and the memory devices 330 may communicate via bus 310 using an ONFI protocol, and the bus 310 may be referred to as an ONFI bus, though other protocols may alternatively be used. By way of example, there may be eight (8) memory devices 330 coupled with memory system controller 315. In other examples, there may be more than or less than eight (8) memory devices 330 coupled with the memory system controller 315. It should be noted, a quantity of memory devices 330 in the system 300 are not limiting on the claims. The system 300 may support operations according to the timing diagram 200 described with reference to FIG. 2.

As described with reference to FIGS. 1 and 2, the memory system controller 315 may be configured to communicate commands 320 (e.g., from a host system) to the memory devices 330. In some examples, the memory system controller 315 may be configured to transmit commands 320 to the memory devices 330 via the bus 310. Bus 310 may be configured to communicate signals, commands 320, data 305, and flags 325 between the memory system controller 315 and the memory devices 330. In some examples, the bus 310 may be configured to have a quantity of bits equal to a quantity of data input/output (DQ) pins of the memory system controller 315. For example, the bus 310 may be an eight (8) bit bus 310 if the memory system controller 315 has eight (8) DQ pins. In some examples, the bus 310 may also include a quantity of lines equal to the quantity of bits (e.g., each line of the bus 310 may be configured to communicate a bit of information). In some examples, the bus 310 may also communicate an indication of the flag 325 of each memory device 330 performing an operation concurrently. In some cases, the bus 310 may be an example of an ONFI bus.

The memory system controller 315 may be configured to transmit commands 320 to initiate access operations at a memory device 330. In some cases, the memory system controller 315 may transmit commands 320 to initiate concurrent operations (e.g., operations that may not be initiated at the same time but proceed in parallel at multiple memory devices 330). For example, the memory system controller 315 may transmit a command 320 to the memory device 330-a to initiate a first operation. Additionally, the memory system controller 315 may then transmit a second command 320 to the memory device 330-b to initiate a second operation. In such examples, the first operation and the second operations may be performed concurrently (e.g., in parallel) by the memory device 330-a and the memory device 330-b.

The memory devices 330 may be configured to indicate, via a flag 325, whether that memory device 330 has completed any access operations (e.g., executed in response to receiving a command 320 from the memory system controller 315). The flag 325 may be a single bit indicating whether an associated memory device 330 is ready to be serviced (i.e., whether at least one plane 365 of the memory die 360 has completed at least one access operation). In some cases, more than one memory device 330 may indicate the flag associated with that memory device 330 to the memory system controller 315 (e.g., via the bus 310).

Additionally, each memory device 330 may include a register 345 with a quantity of bits (e.g., status bits) each corresponding to one of the planes 365 of that memory device 330. For example, the memory device 330-a may include the register 345, where the register 345 includes at least a first bit associated with the plane 365-a and a second bit associated with the plane 365-b. Each bit of the register 345 may indicate whether the corresponding plane 365 has completed an access operation. For example, a first bit of register 345 may indicate whether the memory device 330-a has completed an access operation at the plane 365-a and a second bit of the register 345 may indicate whether the memory device 330-a has completed an access operation at the plane 365-b.

The memory system controller 315 may poll the flags 325 associated with each memory device 330. For example, the memory system controller 315 may poll the flags 325 of each memory device 330 associated with pending access operations. In some examples, the memory system controller 315 may poll flags 325 associated with more than one memory device 330 concurrently. For example, in some cases, the memory system controller 315 may transmit a single polling request for flags 325 via the bus 310, and the polling request may be received by each memory device 330 due to the memory devices 330 sharing the bus 310. In some cases, each memory device 330 may indicate a respective flag 325 using a different signal line (or set of signal lines) of the bus 310, such that the bus 310 carries multiple flags 325 associated with the different memory devices 330 concurrently.

In some cases, one memory device 330 (or memory die 360) may act as a master memory device 330 (or master memory die 360) for one or more other memory devices 330 (or memory dies 360). For example, in cases that the system 300 includes more memory devices 330 (or memory dies 360) than a quantity of channels included in the bus 310, the master memory device 330 (or master memory die 360) may track and communicate the completion status of more than one memory device 330 or memory dies 360 (e.g., using pulse position modulation (PPM) signals build subnets among the master memory device 330 or die and the one or more other memory devices 330 or memory dies 360 associated with the same completion flag). That is, the master may maintain a flag 325 that applies to the one or more memory devices 330 (or memory dies 360) and may track the flags 325 and registers 345 of the one or more memory devices 330 (or memory dies 360) and communicate an indication of states of the associated flag 325, associated registers 345, or both to the memory system controller 315.

If the memory system controller 315 identifies a flag 325 indicating that an associated memory device 330 has completed at least one access operation, the memory system controller 315 may then poll the register 345 associated with that memory device 330. Based on polling the register 345, the memory system controller 315 may identify the one or more planes 365 associated with completed access operations. In a case that the access operation corresponds to a read command (e.g., a snap read command), the memory device 330 may communicate data 305 (e.g., associated with the read command) to the memory system controller 315 via the bus 310 via a direct memory access operation.

Figure 4:
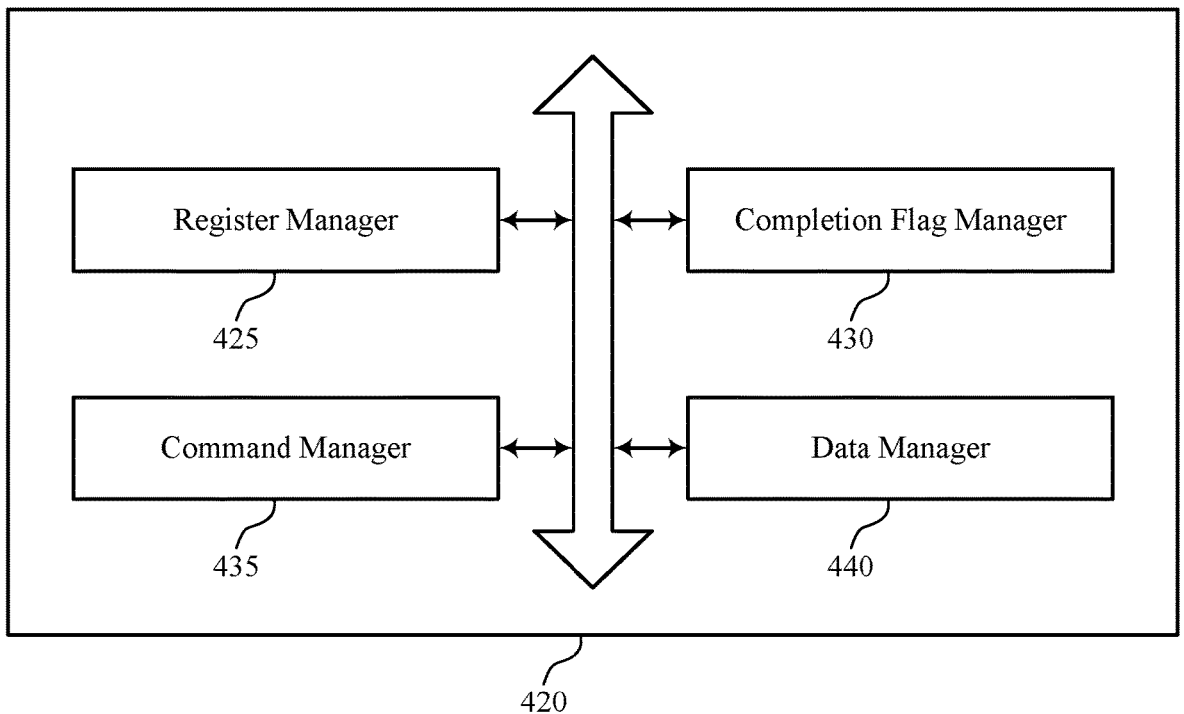
FIG. 4 shows a block diagram of a memory device that supports a completion flag for memory operations in accordance with examples as disclosed herein.

FIG. 4 shows a block diagram 400 of a memory device 420 that supports a completion flag for memory operations in accordance with examples as disclosed herein. The memory device 420 may be an example of aspects of a memory device (e.g., including a memory die) as described with reference to FIGS. 1 through 3. For example, the memory device 420 may include aspects of a local controller as described with reference to FIGS. 1 through 3. The memory device 420, or various components thereof, may be an example of means for performing various techniques related to a completion flag for memory operations as described herein. For example, the memory device 420 may include a register manager 425, a completion flag manager 430, a command manager 435, a data manager 440, or any combination thereof. Each of these components may communicate, directly or indirectly, with one another (e.g., via one or more buses).

The register manager 425 may be configured as or otherwise support a means for setting a first status bit of a register based at least in part on a completion of an access operation at a first plane of a plurality of planes of a memory die, wherein the register is associated with the memory die and is configured to store a plurality of status bits each corresponding to a respective one of the plurality of planes, and wherein the first status bit corresponds to the first plane. The completion flag manager 430 may be configured as or otherwise support a means for setting a flag associated with the memory die to indicate a completion of at least one access operation at the memory die based at least in part on the completion of the access operation at the first plane. The command manager 435 may be configured as or otherwise support a means for receiving, from a controller based at least in part on the flag to indicate the completion of at least one access operation being set, a command to output data associated with the first plane. The data manager 440 may be configured as or otherwise support a means for outputting, to the controller based at least in part on the command, data corresponding to the access operation at the first plane.

In some examples, the register manager 425 may be configured as or otherwise support a means for setting, while the flag associated with the memory die is set, a second status bit of the register corresponding to a second plane of the plurality of planes based at least in part on a completion of a second access operation at the second plane. In some examples, the command manager 435 may be configured as or otherwise support a means for receiving, from the controller based at least in part on the flag to indicate the completion of at least one access operation being set, a second command to output data associated with the second plane. In some examples, the data manager 440 may be configured as or otherwise support a means for outputting, to the controller based at least in part on the second command, data corresponding to the second access operation at the second plane.

In some examples, the completion flag manager 430 may be configured as or otherwise support a means for determining, based at least in part on the completion of the second access operation at the second plane, whether the flag to indicate the completion of at least one access operation at the memory die is set.

In some examples, the completion flag manager 430 may be configured as or otherwise support a means for receiving, from the controller after setting the flag to indicate the completion of at least one access operation at the memory die, a polling request for the flag. In some examples, the completion flag manager 430 may be configured as or otherwise support a means for outputting, to the controller in response to the polling request for the flag, an indication that the flag is set. In some examples, the completion flag manager 430 may be configured as or otherwise support a means for resetting the flag in response to the polling request for the flag.

In some examples, the register manager 425 may be configured as or otherwise support a means for receiving, from the controller after setting the flag to indicate the completion of at least one access operation, a polling request for the register. In some examples, the register manager 425 may be configured as or otherwise support a means for outputting, to the controller in response to the polling request for the register, a plurality of indications each indicating a value of a respective status bit of the register. In some examples, the completion flag manager 430 may be configured as or otherwise support a means for resetting the flag in response to the polling request for the register.

In some examples, the register manager 425 may be configured as or otherwise support a means for receiving, from the controller after setting the flag to indicate the completion of at least one access operation, a polling request for the register. In some examples, the register manager 425 may be configured as or otherwise support a means for resetting each of the plurality of status bits in response to the polling request for the register.

In some examples, the register manager 425 (e.g., where included in a second memory device 420 or, additionally or alternatively, a second memory die) may be configured as or otherwise support a means for setting a status bit of a second register corresponding to a plane of a second plurality of planes to indicate a completion of an access operation at the plane, wherein the second register is associated with a second memory die comprising the second plurality of planes and is configured to store a second plurality of status bits each corresponding to a respective one of the second plurality of planes. In some examples, the completion flag manager 430 may be configured as or otherwise support a means for setting a second flag associated with the second memory die to indicate the completion of at least one access operation at the second memory die based at least in part on the completion of the access operation at the plane. In some examples, the command manager 435 may be configured as or otherwise support a means for receiving, from the controller based at least in part on the second flag to indicate the completion of at least one access operation at the second memory die being set, a command to output data associated with the plane. In some examples, the data manager 440 may be configured as or otherwise support a means for outputting, to the controller based at least in part on the command to output data associated with the plane, data corresponding to the access operation at the plane.

In some examples, a bus may couple the memory device 420 with the second memory device 420, and the bus may be configured to concurrently carry a first polling request for the flag associated with the memory die and a second polling request for the second flag associated with the second memory die.

In some examples, a bus may couple the memory device 420 with the second memory device 420, and the bus may be configured to concurrently carry a first indication of a value of the flag associated with the memory die and a second indication of a value of the second flag associated with the second memory die.

In some examples, to support outputting the data corresponding to the access operation at the first plane, the data manager 440 may be configured as or otherwise support a means for outputting the data to the controller via a direct memory access operation.

In some examples, the command manager 435 may be configured as or otherwise support a means for receiving, from the controller, a command to execute the access operation at the first plane. In some examples, the command manager 435 may be configured as or otherwise support a means for executing the access operation at the first plane based at least in part on the command to execute the access operation at the first plane.

In some examples, the access operation at the first plane may be a snap read operation at the first plane.

Figure 5:
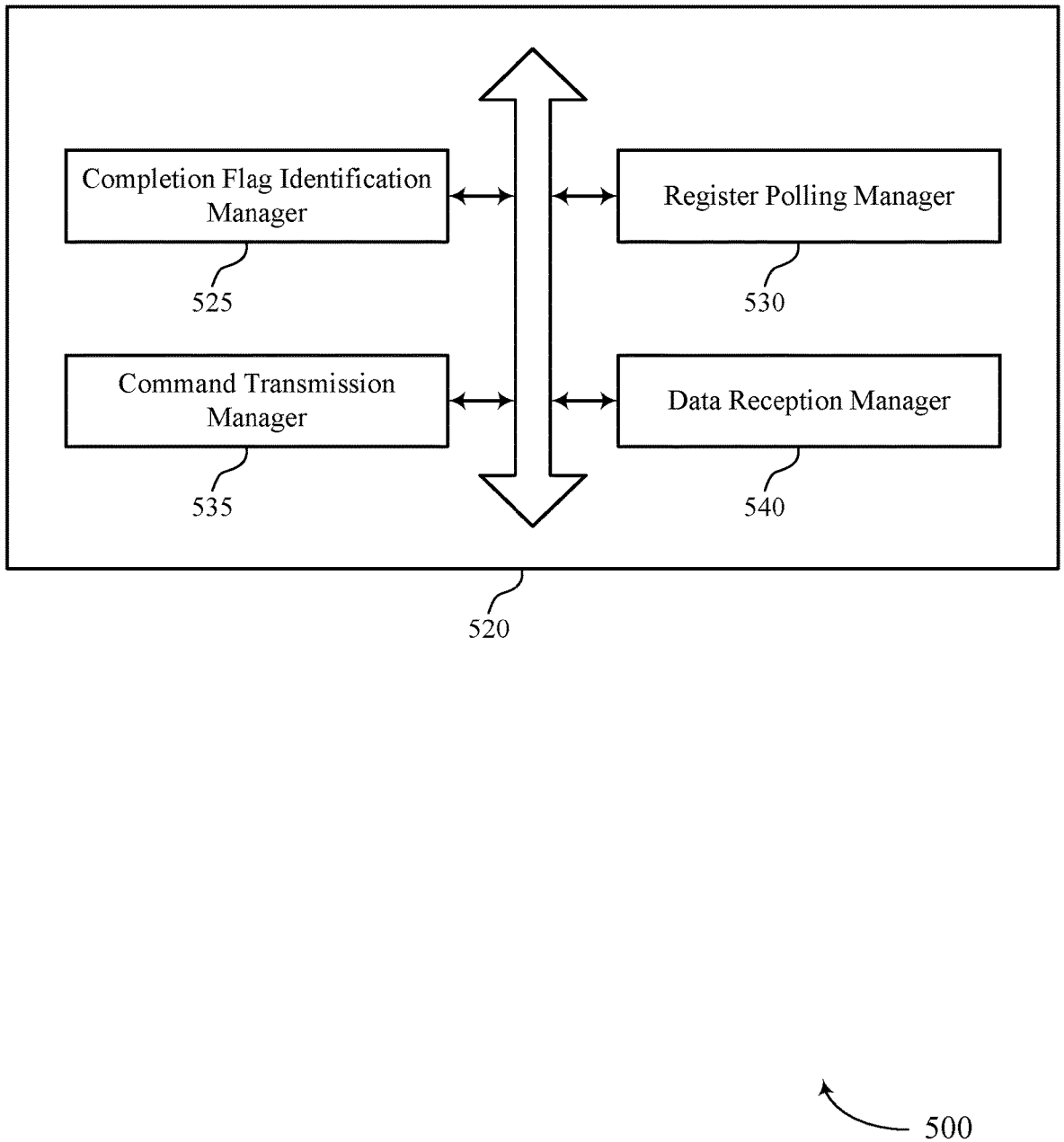
FIG. 5 shows a block diagram of a memory system controller that supports a completion flag for memory operations in accordance with examples as disclosed herein.

FIG. 5 shows a block diagram 500 of a memory system controller 520 that supports a completion flag for memory operations in accordance with examples as disclosed herein. The memory system controller 520 may be an example of aspects of a memory system controller as described with reference to FIGS. 1 through 3. Additionally or alternatively, the memory system controller 520 may include aspects of a host system controller as described with reference to FIG. 1. The memory system controller 520, or various components thereof, may be an example of means for performing various techniques related to a completion flag for memory operations as described herein. For example, the memory system controller 520 may include a completion flag identification manager 525, a register polling manager 530, a command transmission manager 535, a data reception manager 540, or any combination thereof. Each of these components may communicate, directly or indirectly, with one another (e.g., via one or more buses).

The completion flag identification manager 525 may be configured as or otherwise support a means for identifying that a flag associated with a memory die indicates a completion of at least one access operation at the memory die, the memory die including a plurality of planes. The register polling manager 530 may be configured as or otherwise support a means for polling, based at least in part on the flag indicating the completion of at least one access operation at the memory die, a register associated with the memory die and configured to store a plurality of status bits each corresponding to a respective one of the plurality of planes. In some examples, the register polling manager 530 may be configured as or otherwise support a means for identifying, based at least in part on polling the register, a completion of an access operation at a first plane of the plurality of planes based at least in part on a first status bit of the register corresponding to the first plane indicating the completion of the access operation at the first plane. The command transmission manager 535 may be configured as or otherwise support a means for transmitting, to the memory die based at least in part on identifying the completion of the access operation at the first plane, a command to output data associated with the first plane. The data reception manager 540 may be configured as or otherwise support a means for receiving, from the memory die based at least in part on the command, data corresponding to the access operation at the first plane.

In some examples, the completion flag identification manager 525 may be configured as or otherwise support a means for polling a plurality of flags including the flag associated with the memory die, where each of the plurality of flags is associated with a respective one of a plurality of memory dies included in a memory system. In some examples, the completion flag identification manager 525 may be configured as or otherwise support a means for identifying that the flag indicates the completion of at least one access operation at the memory die based at least in part on polling the plurality of flags.

In some examples, the completion flag identification manager 525 may be configured as or otherwise support a means for identifying, based at least in part on polling the plurality of flags, that a second flag associated with a second memory die included in the memory system indicates that no access operation has been completed at the second memory die. In some examples, the register polling manager 530 may be configured as or otherwise support a means for refraining from polling a second register associated with the second memory die based at least in part on the second flag associated with the second memory die indicating that no access operation has been completed at the second memory die, the second register configured to store a second plurality of status bits each corresponding to a respective one of a second plurality of planes included in the second memory die.

In some examples, the completion flag identification manager 525 may be configured as or otherwise support a means for identifying, based at least in part on polling the plurality of flags, that a second flag associated with a second memory die included in the memory system indicates a completion of at least one access operation at the second memory die, the second memory die including a second plurality of planes. In some examples, the register polling manager 530 may be configured as or otherwise support a means for polling, based at least in part on the second flag indicating the completion of at least one access operation at the second memory die, a second register associated with the second memory die and configured to store a second plurality of status bits each corresponding to a respective one of the second plurality of planes. In some examples, the register polling manager 530 may be configured as or otherwise support a means for identifying, based at least in part on polling the second register, a completion of a second access operation at a second plane of the second plurality of planes based at least in part on a second status bit of the second register corresponding to the second plane indicating the completion of the second access operation at the second plane. In some examples, the command transmission manager 535 may be configured as or otherwise support a means for transmitting, to the second memory die based at least in part on identifying the completion of the second access operation at the second plane, a second command to output data associated with the second plane. In some examples, the data reception manager 540 may be configured as or otherwise support a means for receiving, from the second memory die based at least in part on the second command, data corresponding to the second access operation at the second plane.

In some examples, to support polling the plurality of flags, the completion flag identification manager 525 may be configured as or otherwise support a means for concurrently polling each flag of the plurality of flags via a bus coupled with each of the plurality of memory dies.

In some examples, the completion flag identification manager 525 may be configured as or otherwise support a means for receiving, based at least in part on polling the plurality of flags, a plurality of indications concurrently via a bus coupled with each of the plurality of memory dies, each of the plurality of indications indicating a value of a respective one of the plurality of flags.

In some examples, the register polling manager 530 may be configured as or otherwise support a means for identifying, based at least in part on polling the register, a completion of a second access operation at a second plane of the plurality of planes based at least in part on a second status bit of the register corresponding to the second plane indicating the completion of the second access operation at the second plane. In some examples, the command transmission manager 535 may be configured as or otherwise support a means for transmitting, to the memory die based at least in part on identifying the completion of the second access operation at the second plane, a second command to output data associated with the second plane. In some examples, the data reception manager 540 may be configured as or otherwise support a means for receiving, from the memory die based at least in part on the second command, data corresponding to the second access operation at the second plane.

In some examples, to support receiving data corresponding to the access operation at the first plane, the data reception manager 540 may be configured as or otherwise support a means for receiving the data from the memory die via a direct memory access operation.

In some examples, the command transmission manager 535 may be configured as or otherwise support a means for transmitting, to the memory die, a command to execute the access operation at the first plane, where, identifying that the flag associated with the memory die indicates the completion of at least one access operation at the memory die includes polling the flag associated with the memory die after transmitting the command to execute the access operation at the first plane.

In some examples, the access operation at the first plane may be a snap read operation at the first plane.

Figure 6:
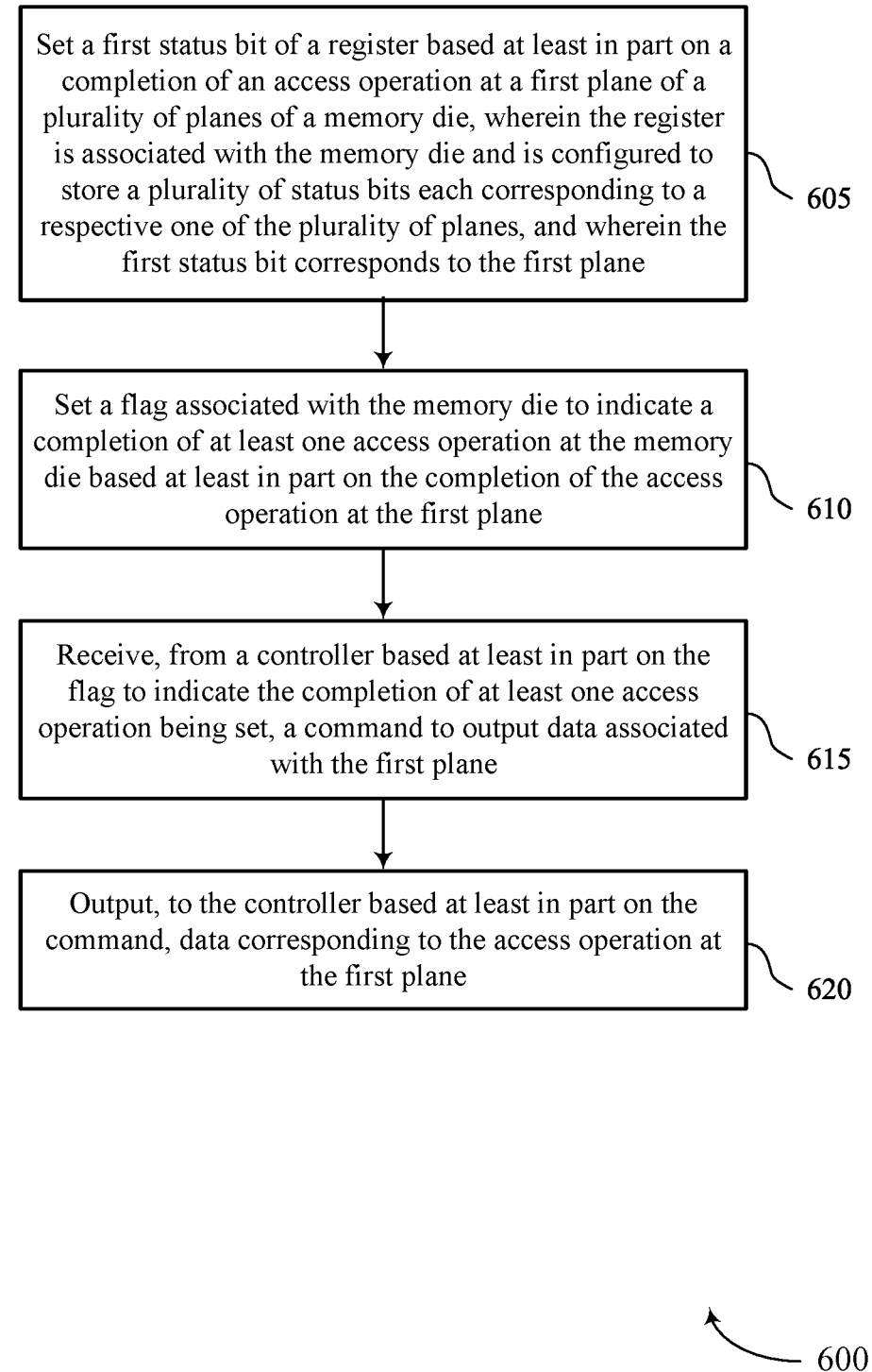
FIGS. 6 and 7 show flowcharts illustrating a method or methods that support a completion flag for memory operations in accordance with examples as disclosed herein.

FIG. 6 shows a flowchart illustrating a method 600 that supports a completion flag for memory operations in accordance with examples as disclosed herein. The operations of method 600 may be implemented by a memory device or its components as described herein. For example, the operations of method 600 may be performed by a memory device as described with reference to FIGS. 1 through 4 (e.g., a local controller thereof). In some examples, a memory device (e.g., a local controller thereof) may execute a set of instructions to control the functional elements of the memory device to perform the described functions. Additionally or alternatively, the memory device may perform aspects of the described functions using special-purpose hardware.

At 605, the method may include setting a first status bit of a register based at least in part on a completion of an access operation at a first plane of a plurality of planes of a memory die, wherein the register is associated with the memory die and is configured to store a plurality of status bits each corresponding to a respective one of the plurality of planes, and wherein the first status bit corresponds to the first plane. The operations of 605 may be performed in accordance with examples as disclosed herein. In some examples, aspects of the operations of 605 may be performed by a register manager 425 as described with reference to FIG. 4.

At 610, the method may include setting a flag associated with a memory die to indicate a completion of at least one access operation at the memory die based at least in part on the completion of the access operation at the first plane. The operations of 610 may be performed in accordance with examples as disclosed herein. In some examples, aspects of the operations of 610 may be performed by a completion flag manager 430 as described with reference to FIG. 4.

At 615, the method may include receiving, from a controller based at least in part on the flag to indicate the completion of at least one access operation being set, a command to output data associated with the first plane. The operations of 615 may be performed in accordance with examples as disclosed herein. In some examples, aspects of the operations of 615 may be performed by a command manager 435 as described with reference to FIG. 4.

At 620, the method may include outputting, to the controller based at least in part on the command, data corresponding to the access operation at the first plane. The operations of 620 may be performed in accordance with examples as disclosed herein. In some examples, aspects of the operations of 620 may be performed by a data manager 440 as described with reference to FIG. 4.

In some examples, an apparatus as described herein may perform a method or methods, such as the method 600. The apparatus may include, features, circuitry, logic, means, or instructions (e.g., a non-transitory computer-readable medium storing instructions executable by a processor) for setting a first status bit of a register corresponding to a first plane of a plurality of planes based at least in part on a completion of an access operation at the first plane, wherein the register is associated with a memory die comprising the plurality of planes and is configured to store a plurality of status bits each corresponding to a respective one of the plurality of planes, setting a flag associated with the memory die to indicate a completion of at least one access operation at the memory die based at least in part on the completion of the access operation at the first plane, receiving, from a controller based at least in part on the flag to indicate the completion of at least one access operation being set, a command to output data associated with the first plane, and outputting, to the controller based at least in part on the command, data corresponding to the access operation at the first plane.

Some examples of the method 600 and the apparatus described herein may further include operations, features, circuitry, logic, means, or instructions for setting, while the flag associated with the memory die may be set, a second status bit of the register corresponding to a second plane of the plurality of planes based at least in part on a completion of a second access operation at the second plane, receiving, from the controller based at least in part on the flag to indicate the completion of at least one access operation being set, a second command to output data associated with the second plane, and outputting, to the controller based at least in part on the second command, data corresponding to the second access operation at the second plane.

Some examples of the method 600 and the apparatus described herein may further include operations, features, circuitry, logic, means, or instructions for determining, based at least in part on the completion of the second access operation at the second plane, whether the flag to indicate the completion of at least one access operation at the memory die is set.

Some examples of the method 600 and the apparatus described herein may further include operations, features, circuitry, logic, means, or instructions for receiving, from the controller after setting the flag to indicate the completion of at least one access operation at the memory die, a polling request for the flag, outputting, to the controller in response to the polling request for the flag, an indication that the flag is set, and resetting the flag in response to the polling request for the flag.

Some examples of the method 600 and the apparatus described herein may further include operations, features, circuitry, logic, means, or instructions for receiving, from the controller after setting the flag to indicate the completion of at least one access operation, a polling request for the register, outputting, to the controller in response to the polling request for the register, a plurality of indications each indicating a value of a respective status bit of the register, and resetting the flag in response to the polling request for the register.

Some examples of the method 600 and the apparatus described herein may further include operations, features, circuitry, logic, means, or instructions for receiving, from the controller after setting the flag to indicate the completion of at least one access operation, a polling request for the register and resetting each of the plurality of status bits in response to the polling request for the register.

Some examples of the method 600 and the apparatus described herein may further include operations, features, circuitry, logic, means, or instructions for setting a status bit of a second register corresponding to a plane of a second plurality of planes to indicate a completion of an access operation at the plane, wherein the second register is associated with a second memory die comprising the second plurality of planes and is configured to store a second plurality of status bits each corresponding to a respective one of the second plurality of planes, setting a second flag associated with the second memory die to indicate the completion of at least one access operation at the second memory die based at least in part on the completion of the access operation at the plane, receiving, from the controller based at least in part on the second flag to indicate the completion of at least one access operation at the second memory die being set, a command to output data associated with the plane, and outputting, to the controller based at least in part on the command to output data associated with the plane, data corresponding to the access operation at the plane.

In some examples of the method 600 and the apparatus described herein, a bus may couple the controller with the first memory die (e.g., with a controller thereof) and the second memory die (e.g., with a controller thereof), and the bus may be configured to support concurrent polling of the flag associated with the memory die and the second flag associated with the second memory die.

In some examples of the method 600 and the apparatus described herein, a bus may couple the controller with the first memory die (e.g., with a controller thereof) and the second memory die (e.g., with a controller thereof), and the bus may be configured to concurrently carry a first indication of a value of the flag associated with the memory die and a second indication of a value of the second flag associated with the second memory die.

In some examples of the method 600 and the apparatus described herein, operations, features, circuitry, logic, means, or instructions for outputting the data corresponding to the access operation at the first plane may include operations, features, circuitry, logic, means, or instructions for outputting the data to the controller via a direct memory access operation.

Some examples of the method 600 and the apparatus described herein may further include operations, features, circuitry, logic, means, or instructions for receiving, from the controller, a command to execute the access operation at the first plane and executing the access operation at the first plane based at least in part on the command to execute the access operation at the first plane.

In some examples of the method 600 and the apparatus described herein, the access operation at the first plane includes a snap read operation at the first plane.

Figure 7:
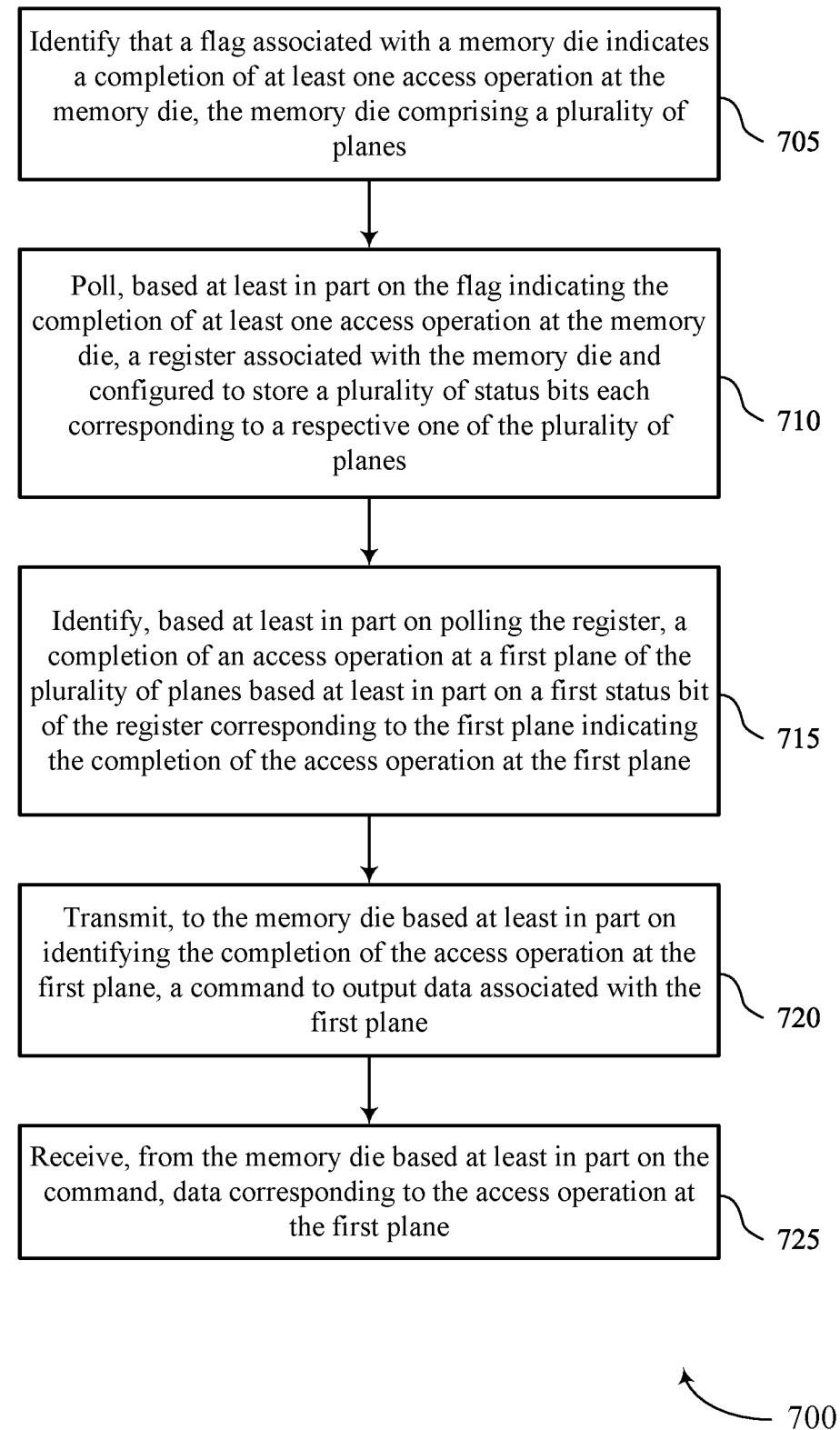

FIG. 7 shows a flowchart illustrating a method 700 that supports a completion flag for memory operations in accordance with examples as disclosed herein. The operations of method 700 may be implemented by a memory system controller or a host system controller or its components as described herein. For example, the operations of method 700 may be performed by a memory system controller or a host system controller as described with reference to any of FIGS. 1 through 3 and 5. In some examples, a memory system controller may execute a set of instructions to control the functional elements of the device to perform the described functions. Additionally or alternatively, the memory system controller or host system controller may perform aspects of the described functions using special-purpose hardware.

At 705, the method may include identifying that a flag associated with a memory die indicates a completion of at least one access operation at the memory die, the memory die including a plurality of planes. The operations of 705 may be performed in accordance with examples as disclosed herein. In some examples, aspects of the operations of 705 may be performed by a completion flag identification manager 525 as described with reference to FIG. 5.

At 710, the method may include polling, based at least in part on the flag indicating the completion of at least one access operation at the memory die, a register associated with the memory die and configured to store a plurality of status bits each corresponding to a respective one of the plurality of planes. The operations of 710 may be performed in accordance with examples as disclosed herein. In some examples, aspects of the operations of 710 may be performed by a register polling manager 530 as described with reference to FIG. 5.

At 715, the method may include identifying, based at least in part on polling the register, a completion of an access operation at a first plane of the plurality of planes based at least in part on a first status bit of the register corresponding to the first plane indicating the completion of the access operation at the first plane. The operations of 715 may be performed in accordance with examples as disclosed herein. In some examples, aspects of the operations of 715 may be performed by a register polling manager 530 as described with reference to FIG. 5.

At 720, the method may include transmitting, to the memory die based at least in part on identifying the completion of the access operation at the first plane, a command to output data associated with the first plane. The operations of 720 may be performed in accordance with examples as disclosed herein. In some examples, aspects of the operations of 720 may be performed by a command transmission manager 535 as described with reference to FIG. 5.

At 725, the method may include receiving, from the memory die based at least in part on the command, data corresponding to the access operation at the first plane. The operations of 725 may be performed in accordance with examples as disclosed herein. In some examples, aspects of the operations of 725 may be performed by a data reception manager 540 as described with reference to FIG. 5.

In some examples, an apparatus as described herein may perform a method or methods, such as the method 700. The apparatus may include, features, circuitry, logic, means, or instructions (e.g., a non-transitory computer-readable medium storing instructions executable by a processor) for identifying that a flag associated with a memory die indicates a completion of at least one access operation at the memory die, the memory die including a plurality of planes, polling, based at least in part on the flag indicating the completion of at least one access operation at the memory die, a register associated with the memory die and configured to store a plurality of status bits each corresponding to a respective one of the plurality of planes, identifying, based at least in part on polling the register, a completion of an access operation at a first plane of the plurality of planes based at least in part on a first status bit of the register corresponding to the first plane indicating the completion of the access operation at the first plane, transmitting, to the memory die based at least in part on identifying the completion of the access operation at the first plane, a command to output data associated with the first plane, and receiving, from the memory die based at least in part on the command, data corresponding to the access operation at the first plane.

Some examples of the method 700 and the apparatus described herein may further include operations, features, circuitry, logic, means, or instructions for polling a plurality of flags including the flag associated with the memory die, where each of the plurality of flags may be associated with a respective one of a plurality of memory dies included in a memory system, and where identifying that the flag indicates the completion of at least one access operation at the memory die is based at least in part on polling the plurality of flags.

Some examples of the method 700 and the apparatus described herein may further include operations, features, circuitry, logic, means, or instructions for identifying, based at least in part on polling the plurality of flags, that a second flag associated with a second memory die included in the memory system indicates that no access operation has been completed at the second memory die, and refraining from polling a second register associated with the second memory die based at least in part on the second flag associated with the second memory die indicating that no access operation has been completed at the second memory die, the second register configured to store a second plurality of status bits each corresponding to a respective one of a second plurality of planes included in the second memory die.

Some examples of the method 700 and the apparatus described herein may further include operations, features, circuitry, logic, means, or instructions for identifying, based at least in part on polling the plurality of flags, that a second flag associated with a second memory die included in the memory system indicates a completion of at least one access operation at the second memory die, the second memory die including a second plurality of planes, polling, based at least in part on the second flag indicating the completion of at least one access operation at the second memory die, a second register associated with the second memory die and configured to store a second plurality of status bits each corresponding to a respective one of the second plurality of planes, identifying, based at least in part on polling the second register, a completion of a second access operation at a second plane of the second plurality of planes based at least in part on a second status bit of the second register corresponding to the second plane indicating the completion of the second access operation at the second plane, transmitting, to the second memory die based at least in part on identifying the completion of the second access operation at the second plane, a second command to output data associated with the second plane, and receiving, from the second memory die based at least in part on the second command, data corresponding to the second access operation at the second plane.

In some examples of the method 700 and the apparatus described herein, operations, features, circuitry, logic, means, or instructions for polling the plurality of flags may include operations, features, circuitry, logic, means, or instructions for concurrently polling each flag of the plurality of flags via a bus coupled with each of the plurality of memory dies.

Some examples of the method 700 and the apparatus described herein may further include operations, features, circuitry, logic, means, or instructions for receiving, based at least in part on polling the plurality of flags, a plurality of indications concurrently via a bus coupled with each of the plurality of memory dies, each of the plurality of indications indicating a value of a respective one of the plurality of flags.

Some examples of the method 700 and the apparatus described herein may further include operations, features, circuitry, logic, means, or instructions for identifying, based at least in part on polling the register, a completion of a second access operation at a second plane of the plurality of planes based at least in part on a second status bit of the register corresponding to the second plane indicating the completion of the second access operation at the second plane, transmitting, to the memory die based at least in part on identifying the completion of the second access operation at the second plane, a second command to output data associated with the second plane, and receiving, from the memory die based at least in part on the second command, data corresponding to the second access operation at the second plane.

In some examples of the method 700 and the apparatus described herein, operations, features, circuitry, logic, means, or instructions for receiving data corresponding to the access operation at the first plane may include operations, features, circuitry, logic, means, or instructions for receiving the data from the memory die via a direct memory access operation.

Some examples of the method 700 and the apparatus described herein may further include operations, features, circuitry, logic, means, or instructions for transmitting, to the memory die, a command to execute the access operation at the first plane, where operations, features, circuitry, logic, means, or instructions for identifying that the flag associated with the memory die indicates the completion of at least one access operation at the memory die may include operations, features, circuitry, logic, means, or instructions for polling the flag associated with the memory die after transmitting the command to execute the access operation at the first plane.

In some examples of the method 700 and the apparatus described herein, the access operation at the first plane may be a snap read operation at the first plane.

It should be noted that the methods described above describe possible implementations, and that the operations and the steps may be rearranged or otherwise modified and that other implementations are possible. Further, portions from two or more of the methods may be combined.

An apparatus is described. The apparatus may include a memory die including a plurality of planes, a register associated with the memory die and configured to store a plurality of status bits each corresponding to a respective one of the plurality of planes, and a first controller for the memory die. The first controller may be configured to cause the apparatus to set a first status bit of the register corresponding to a first plane of the plurality of planes based at least in part on a completion of an access operation at the first plane, set a flag associated with the memory die to indicate a completion of at least one access operation at the memory die based at least in part on the completion of the access operation at the first plane, receive, from a second controller based at least in part on the flag to indicate the completion of at least one access operation being set, a command to output data associated with the first plane, and output, to the second controller based at least in part on the command, data corresponding to the access operation at the first plane.

In some examples, the controller may be further configured to cause the apparatus to set, while the flag associated with the memory die is set, a second status bit of the register corresponding to a second plane of the plurality of planes based at least in part on a completion of a second access operation at the second plane, receive, from the second controller based at least in part on the flag to indicate the completion of at least one access operation being set, a second command to output data associated with the second plane, and output, to the second controller based at least in part on the second command, data corresponding to the second access operation at the second plane.

In some examples, the controller may be further configured to cause the apparatus to determine, based at least in part on the completion of the second access operation at the second plane, whether the flag to indicate the completion of at least one access operation at the memory die is set.

In some examples, the controller may be further configured to cause the apparatus to receive, from the second controller after setting the flag to indicate the completion of at least one access operation at the memory die, a polling request for the flag, output, to the second controller in response to the polling request for the flag, an indication that the flag is set, and reset the flag in response to the polling request for the flag.

In some examples, the controller may be further configured to cause the apparatus to receive, from the second controller after setting the flag to indicate the completion of at least one access operation, a polling request for the register, output, to the second controller in response to the polling request for the register, a plurality of indications each indicating a value of a respective status bit of the register, and reset the flag in response to the polling request for the register.

In some examples, the controller may be further configured to cause the apparatus to receive, from the second controller after setting the flag to indicate the completion of at least one access operation, a polling request for the register and reset each of the plurality of status bits in response to the polling request for the register.

In some examples, the apparatus may include a second memory die including a second plurality of planes, a second register associated with the second memory die and configured to store a second plurality of status bits each corresponding to a respective one of the second plurality of planes, and a third controller for the second memory die. The third controller may be configured to cause the apparatus to set a status bit of the second register corresponding to a plane of the second plurality of planes to indicate a completion of an access operation at the plane, set a second flag associated with the second memory die to indicate the completion of at least one access operation at the second memory die based at least in part on the completion of the access operation at the plane, receive, from the second controller based at least in part on the second flag to indicate the completion of at least one access operation at the second memory die being set, a command to output data associated with the plane, and output, to the second controller based at least in part on the command to output data associated with the plane, data corresponding to the access operation at the plane.

In some examples, the apparatus may include a bus coupling the second controller with the first controller and the third controller, where the bus may be configured to support concurrent polling of the flag associated with the memory die and the second flag associated with the second memory die.

In some examples, the apparatus may include a bus coupling the second controller with the first controller and the third controller, where the bus may be configured to concurrently carry a first indication of a value of the flag associated with the memory die and a second indication of a value of the second flag associated with the second memory die.

In some examples, to output the data corresponding to the access operation at the first plane, the controller may be configured to cause the apparatus to output the data to the second host controller via a direct memory access operation.

In some examples, the controller may be further configured to cause the apparatus to receive, from the second controller, a command to execute the access operation at the first plane and execute the access operation at the first plane based at least in part on the command to execute the access operation at the first plane.

In some examples, the access operation at the first plane may be a snap read operation at the first plane.

An apparatus is described. The apparatus may include a controller configured to couple with a memory die of a memory system, where the controller is configured to cause the apparatus to identify that a flag associated with the memory die indicates a completion of at least one access operation at the memory die, the memory die including a plurality of planes, poll, based at least in part on the flag indicating the completion of at least one access operation at the memory die, a register associated with the memory die and configured to store a plurality of status bits each corresponding to a respective one of the plurality of planes, identify, based at least in part on polling the register, a completion of an access operation at a first plane of the plurality of planes based at least in part on a first status bit of the register corresponding to the first plane indicating the completion of the access operation at the first plane, transmit, to the memory die based at least in part on identifying the completion of the access operation at the first plane, a command to output data associated with the first plane, and receive, from the memory die based at least in part on the command, data corresponding to the access operation at the first plane.

In some examples, the controller may be further configured to cause the apparatus to poll a plurality of flags including the flag associated with the memory die, where each of the plurality of flags may be associated with a respective one of a plurality of memory dies included in the memory system, and where the controller may be configured to cause the apparatus to identify that the flag indicates the completion of at least one access operation at the memory die based at least in part on polling the plurality of flags.

In some examples, the controller may be further configured to cause the apparatus to identify, based at least in part on polling the plurality of flags, that a second flag associated with a second memory die included in the memory system indicates that no access operation has been completed at the second memory die and refrain from polling a second register associated with the second memory die based at least in part on the second flag associated with the second memory die indicating that no access operation has been completed at the second memory die, the second register configured to store a second plurality of status bits each corresponding to a respective one of a second plurality of planes included in the second memory die.

In some examples, the controller may be further configured to cause the apparatus to identify, based at least in part on polling the plurality of flags, that a second flag associated with a second memory die included in the memory system indicates a completion of at least one access operation at the second memory die, the second memory die including a second plurality of planes, poll, based at least in part on the second flag indicating the completion of at least one access operation at the second memory die, a second register associated with the second memory die and configured to store a second plurality of status bits each corresponding to a respective one of the second plurality of planes, identify, based at least in part on polling the second register, a completion of a second access operation at a second plane of the second plurality of planes based at least in part on a second status bit of the second register corresponding to the second plane indicating the completion of the second access operation at the second plane, transmit, to the second memory die based at least in part on identifying the completion of the second access operation at the second plane, a second command to output data associated with the second plane, and receive, from the second memory die based at least in part on the second command, data corresponding to the second access operation at the second plane.

In some examples, the controller may be further configured to cause the apparatus to concurrently poll each flag of the plurality of flags via a bus coupled with each of the plurality of memory dies.

In some examples, the controller may be further configured to cause the apparatus to receive, based at least in part on polling the plurality of flags, a plurality of indications concurrently via a bus coupled with each of the plurality of memory dies, each of the plurality of indications indicating a value of a respective one of the plurality of flags.

In some examples, the controller may be further configured to cause the apparatus to identify, based at least in part on polling the register, a completion of a second access operation at a second plane of the plurality of planes based at least in part on a second status bit of the register corresponding to the second plane indicating the completion of the second access operation at the second plane, transmit, to the memory die based at least in part on identifying the completion of the second access operation at the second plane, a second command to output data associated with the second plane, and receive, from the memory die based at least in part on the second command, data corresponding to the second access operation at the second plane.

In some examples, the controller may be further configured to cause the apparatus to receive the data from the memory die via a direct memory access operation.

In some examples, the controller may be further configured to cause the apparatus to transmit, to the memory die, a command to execute the access operation at the first plane, where, to identify that the flag associated with the memory die indicates the completion of at least one access operation at the memory die, the controller may be further configured to cause the apparatus to poll the flag associated with the memory die after transmitting the command to execute the access operation at the first plane.

In some examples of the apparatus, the access operation at the first plane may be a snap read operation at the first plane.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other if the switch is open. If a controller isolates two components, the controller affects a change that prevents signals from flowing between the components using a conductive path that previously permitted signals to flow.

The terms "if," "when," "based on," or "based at least in part on" may be used interchangeably. In some examples, if the terms "if," "when," "based on," or "based at least in part on" are used to describe a conditional action, a conditional process, or connection between portions of a process, the terms may be interchangeable.

The term "in response to" may refer to one condition or action occurring at least partially, if not fully, as a result of a previous condition or action. For example, a first condition or action may be performed and second condition or action may at least partially occur as a result of the previous condition or action occurring (whether directly after or after one or more other intermediate conditions or actions occurring after the first condition or action).

Additionally, the terms "directly in response to" or "in direct response to" may refer to one condition or action occurring as a direct result of a previous condition or action. In some examples, a first condition or action may be performed and second condition or action may occur directly as a result of the previous condition or action occurring independent of whether other conditions or actions occur. In some examples, a first condition or action may be performed and second condition or action may occur directly as a result of the previous condition or action occurring, such that no other intermediate conditions or actions occur between the earlier condition or action and the second condition or action or a limited quantity of one or more intermediate steps or actions occur between the earlier condition or action and the second condition or action. Any condition or action described herein as being performed "based on," "based at least in part on," or "in response to" some other step, action, event, or condition may additionally or alternatively (e.g., in an alternative example) be performed "in direct response to" or "directly in response to" such other condition or action unless otherwise specified.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In some other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as an n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" if a voltage greater than or equal to the transistor's threshold voltage is applied to the transistor gate. The transistor may be "off" or "deactivated" if a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over, as one or more instructions or code, a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk, and Blu-ray disc, where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus, comprising:
a memory die comprising a plurality of planes;
a register associated with the memory die and configured to store a plurality of status bits each corresponding to a respective one of the plurality of planes; and
a first controller for the memory die, the first controller configured to cause the apparatus to:
set a first status bit of the register corresponding to a first plane of the plurality of planes based at least in part on a completion of an access operation at the first plane;
set a flag associated with the memory die to indicate a completion of at least one access operation at the memory die based at least in part on the completion of the access operation at the first plane;
receive, from a second controller after setting the flag to indicate the completion of at least one access operation at the memory die, a polling request for the flag;
output, to the second controller in response to the polling request for the flag, an indication that the flag is set;
reset the flag in response to the polling request for the flag;
receive, from the second controller based at least in part on the flag to indicate the completion of at least one access operation being set, a command to output data associated with the first plane; and
output, to the second controller based at least in part on the command, data corresponding to the access operation at the first plane.

2. The apparatus of claim 1, wherein the first controller is further configured to cause the apparatus to:
set, while the flag associated with the memory die is set, a second status bit of the register corresponding to a second plane of the plurality of planes based at least in part on a completion of a second access operation at the second plane;
receive, from the second controller based at least in part on the flag to indicate the completion of at least one access operation being set, a second command to output data associated with the second plane; and
output, to the second controller based at least in part on the second command, data corresponding to the second access operation at the second plane.

3. The apparatus of claim 2, wherein the first controller is further configured to cause the apparatus to:
determine, based at least in part on the completion of the second access operation at the second plane, whether the flag to indicate the completion of at least one access operation at the memory die is set.

4. The apparatus of claim 1, further comprising:
a second memory die comprising a second plurality of planes;
a second register associated with the second memory die and configured to store a second plurality of status bits each corresponding to a respective one of the second plurality of planes; and
a third controller for the second memory die, the third controller configured to cause the apparatus to:
set a status bit of the second register corresponding to a plane of the second plurality of planes to indicate a completion of an access operation at the plane;
set a second flag associated with the second memory die to indicate the completion of at least one access operation at the second memory die based at least in part on the completion of the access operation at the plane;
receive, from the second controller based at least in part on the second flag to indicate the completion of at least one access operation at the second memory die being set, a command to output data associated with the plane; and output, to the second controller based at least in part on the command to output data associated with the plane, data corresponding to the access operation at the plane.

5. The apparatus of claim 4, further comprising:
a bus coupling the second controller with the first controller and the third controller, wherein the bus is configured to support concurrent polling of the flag associated with the memory die and the second flag associated with the second memory die.

6. The apparatus of claim 4, further comprising:
a bus coupling the second controller with the first controller and the third controller, wherein:
the bus is configured to concurrently carry a first indication of a value of the flag associated with the memory die and a second indication of a value of the second flag associated with the second memory die.

7. The apparatus of claim 1, wherein, to output the data corresponding to the access operation at the first plane, the first controller is configured to cause the apparatus to:
output the data to the second controller via a direct memory access operation.

8. The apparatus of claim 1, wherein the first controller is further configured to cause the apparatus to:
receive, from the second controller, a command to execute the access operation at the first plane; and
execute the access operation at the first plane based at least in part on the command to execute the access operation at the first plane.

9. The apparatus of claim 1, wherein the access operation at the first plane comprises a snap read operation at the first plane.

10. An apparatus, comprising:
a controller configured to couple with a memory device comprising a memory die, the controller external to the memory device, wherein the controller is configured to cause the apparatus to:
transmit a polling request to the memory device for a flag stored at the memory device, wherein the flag is reset in response to the polling request;
receive, based at least in part on transmitting the polling request, an indication that the flag is set;
identify that the flag stored at the memory device indicates a completion of at least one access operation at the memory die based at least in part on receiving the indication, the memory die comprising a plurality of planes, wherein the flag comprises a single bit;
poll, based at least in part on the flag indicating the completion of at least one access operation at the memory die, a register included in the memory device and configured to store a plurality of status bits each corresponding to a respective one of the plurality of planes;
identify, based at least in part on polling the register, a completion of an access operation at a first plane of the plurality of planes based at least in part on a first status bit of the register corresponding to the first plane indicating the completion of the access operation at the first plane;
transmit, to the memory die based at least in part on identifying the completion of the access operation at the first plane, a command to output data associated with the first plane; and
receive, from the memory die based at least in part on the command, data corresponding to the access operation at the first plane.

11. The apparatus of claim 10, wherein the controller is further configured to cause the apparatus to:
poll a plurality of flags comprising the flag associated with the memory die, wherein:
each of the plurality of flags is associated with a respective one of a plurality of memory dies; and
the controller is configured to cause the apparatus to identify that the flag indicates the completion of at least one access operation at the memory die based at least in part on polling the plurality of flags.

12. The apparatus of claim 11, wherein the controller is further configured to cause the apparatus to:
identify, based at least in part on polling the plurality of flags, that a second flag associated with a second memory die indicates that no access operation has been completed at the second memory die; and
refrain from polling a second register associated with the second memory die based at least in part on the second flag associated with the second memory die indicating that no access operation has been completed at the second memory die, the second register configured to store a second plurality of status bits each corresponding to a respective one of a second plurality of planes included in the second memory die.

13. The apparatus of claim 11, wherein the controller is further configured to cause the apparatus to:
identify, based at least in part on polling the plurality of flags, that a second flag associated with a second memory die indicates a completion of at least one access operation at the second memory die, the second memory die comprising a second plurality of planes;
poll, based at least in part on the second flag indicating the completion of at least one access operation at the second memory die, a second register associated with the second memory die and configured to store a second plurality of status bits each corresponding to a respective one of the second plurality of planes;
identify, based at least in part on polling the second register, a completion of a second access operation at a second plane of the second plurality of planes based at least in part on a second status bit of the second register corresponding to the second plane indicating the completion of the second access operation at the second plane;
transmit, to the second memory die based at least in part on identifying the completion of the second access operation at the second plane, a second command to output data associated with the second plane; and
receive, from the second memory die based at least in part on the second command, data corresponding to the second access operation at the second plane.

14. The apparatus of claim 11, wherein, to poll the plurality of flags, the controller is configured to cause the apparatus to:
concurrently poll each flag of the plurality of flags via a bus coupled with each of the plurality of memory dies.

15. The apparatus of claim 11, wherein the controller is configured to cause the apparatus to:
receive, based at least in part on polling the plurality of flags, a plurality of indications concurrently via a bus coupled with each of the plurality of memory dies, each of the plurality of indications indicating a value of a respective one of the plurality of flags.

16. The apparatus of claim 10, wherein the controller is further configured to cause the apparatus to:
identify, based at least in part on polling the register, a completion of a second access operation at a second plane of the plurality of planes based at least in part on a second status bit of the register corresponding to the second plane indicating the completion of the second access operation at the second plane;

transmit, to the memory die based at least in part on identifying the completion of the second access operation at the second plane, a second command to output data associated with the second plane; and receive, from the memory die based at least in part on the second command, data corresponding to the second access operation at the second plane.

17. The apparatus of claim 10, wherein, to receive the data corresponding to the access operation at the first plane, the controller is further configured to cause the apparatus to:
receive the data from the memory die via a direct memory access operation.

18. The apparatus of claim 10, wherein the controller is further configured to cause the apparatus to:
transmit, to the memory die, a command to execute the access operation at the first plane, wherein, to identify that the flag associated with the memory die indicates the completion of at least one access operation at the memory die, the controller is further configured to cause the apparatus to poll the flag associated with the memory die after transmitting the command to execute the access operation at the first plane.

19. The apparatus of claim 10, wherein the access operation at the first plane comprises a snap read operation at the first plane.

20. A non-transitory computer-readable medium storing code, the code comprising instructions executable by a processor to:
set a first status bit of a register based at least in part on a completion of an access operation at a first plane of a plurality of planes of a memory die of a memory device, wherein the register is included in the memory device and is configured to store a plurality of status bits each corresponding to a respective one of the plurality of planes, and wherein the first status bit corresponds to the first plane;
set a flag stored at the memory device to indicate a completion of at least one access operation at the memory die based at least in part on the completion of the access operation at the first plane, wherein the flag comprises a single bit;
receive, from a controller external to the memory device after setting the flag to indicate the completion of the at least one access operation, a polling request for the flag;
output, to the controller in response to the polling request for the flag, an indication that the flag is set;
reset the flag in response to the polling request for the flag;
receive, from the controller based at least in part on the flag to indicate the completion of at least one access operation being set, a command to output data associated with the first plane; and
output, to the controller based at least in part on the command, data corresponding to the access operation at the first plane.

21. The non-transitory computer-readable medium of claim 20, wherein the instructions are further executable by the processor to:
set, while the flag associated with the memory die is set, a second status bit of the register corresponding to a second plane of the plurality of planes based at least in part on a completion of a second access operation at the second plane;

receive, from the controller based at least in part on the flag to indicate the completion of at least one access operation being set, a second command to output data associated with the second plane; and output, to the controller based at least in part on the second command, data corresponding to the second access operation at the second plane.

22. The non-transitory computer-readable medium of claim 21, wherein the instructions are further executable by the processor to:
determine, based at least in part on the completion of the second access operation at the second plane, whether the flag to indicate the completion of at least one access operation at the memory die is set.

23. An apparatus, comprising:
a memory die comprising a plurality of planes;
a register associated with the memory die and configured to store a plurality of status bits each corresponding to a respective one of the plurality of planes; and
a first controller for the memory die, the first controller configured to cause the apparatus to:
set a first status bit of the register corresponding to a first plane of the plurality of planes based at least in part on a completion of an access operation at the first plane;
set a flag associated with the memory die to indicate a completion of at least one access operation at the memory die based at least in part on the completion of the access operation at the first plane;
receive, from a second controller after setting the flag to indicate the completion of at least one access operation, a polling request for the register;
output, to the second controller in response to the polling request for the register, a plurality of indications each indicating a value of a respective status bit of the register;
reset the flag in response to the polling request for the register;
receive, from the second controller based at least in part on the flag to indicate the completion of at least one access operation being set, a command to output data associated with the first plane; and
output, to the second controller based at least in part on the command, data corresponding to the access operation at the first plane.

24. An apparatus, comprising:
a memory die comprising a plurality of planes;
a register associated with the memory die and configured to store a plurality of status bits each corresponding to a respective one of the plurality of planes; and
a first controller for the memory die, the first controller configured to cause the apparatus to:
set a first status bit of the register corresponding to a first plane of the plurality of planes based at least in part on a completion of an access operation at the first plane;
set a flag associated with the memory die to indicate a completion of at least one access operation at the memory die based at least in part on the completion of the access operation at the first plane;
receive, from a second controller after setting the flag to indicate the completion of at least one access operation, a polling request for the register;
reset each of the plurality of status bits in response to the polling request for the register;
receive, from the second controller based at least in part on the flag to indicate the completion of at least one access operation being set, a command to output data associated with the first plane; and output, to the second controller based at least in part on the command, data corresponding to the access operation at the first plane.

* * * * *